(12) United States Patent
Lavanchy et al.

(10) Patent No.: US 10,849,356 B2
(45) Date of Patent: Dec. 1, 2020

(54) EXTINGUISHER FOR A SMOKING ARTICLE

(71) Applicant: Philip Morris Products S.A., Neuchatel (CH)

(72) Inventors: Frederic Lavanchy, Chavornay (CH); Laurent Manca, Sullens (CH); Sergey Krasiev, Le Mont-sur-Lausanne (CH); Samuel Malzach, Evilard (CH); Luc Amgwerd, Evilard (CH); Antonino Lanci, Bern (CH); Elmar Mock, Bienne (CH)

(73) Assignee: PHILIP MORRIS PRODUCTS S.A., Neuchatel (CH)

( * ) Notice: Subject to any disclaimer, the term of this patent is extended or adjusted under 35 U.S.C. 154(b) by 302 days.

(21) Appl. No.: 15/316,708

(22) PCT Filed: Jun. 12, 2015

(86) PCT No.: PCT/EP2015/063236
§ 371 (c)(1),
(2) Date: Dec. 6, 2016

(87) PCT Pub. No.: WO2015/189416
PCT Pub. Date: Dec. 17, 2015

(65) Prior Publication Data
US 2018/0184707 A1 Jul. 5, 2018

(30) Foreign Application Priority Data
Jun. 12, 2014 (EP) .................................... 14172172

(51) Int. Cl.
*A24F 13/18* (2006.01)
*F23Q 2/32* (2006.01)
*C09K 5/04* (2006.01)

(52) U.S. Cl.
CPC ................ *A24F 13/18* (2013.01); *C09K 5/04* (2013.01); *F23Q 2/32* (2013.01)

(58) Field of Classification Search
None
See application file for complete search history.

(56) References Cited

U.S. PATENT DOCUMENTS 2,536,302 A   1/1951   Mertzel
4,187,864 A * 2/1980   Taddeo ................. A24F 19/145
                                                      131/242

(Continued)

FOREIGN PATENT DOCUMENTS

CN   2170642 Y   7/1994
CN   2185508 Y   12/1994

(Continued)

OTHER PUBLICATIONS

International Search Report and Written Opinion dated Dec. 21, 2015 in PCT/EP2015/063236 filed Jun. 12, 2015.

(Continued)

*Primary Examiner* — Michael H. Wilson
*Assistant Examiner* — Katherine A Will
(74) *Attorney, Agent, or Firm* — Oblon, McClelland, Maier & Neustadt, L.L.P.

(57) ABSTRACT

There is provided a portable extinguisher for extinguishing a single smoking article at a time, the extinguisher including defining a reservoir, a chamber, and an opening configured to receive a smoking article into the chamber, the chamber being sized to receive at least part of the smoking article and being isolated from the reservoir such that there is no fluid communication between the chamber and the reservoir, wherein the reservoir and the chamber are thermally coupled.

14 Claims, 6 Drawing Sheets

(56) References Cited

U.S. PATENT DOCUMENTS

| | | | |
|---|---|---|---|
| 4,516,587 A | 5/1985 | Eastridge et al. | |
| 4,714,082 A | 12/1987 | Banerjee et al. | |
| 4,809,715 A | 3/1989 | Musetti | |
| 5,035,250 A | 7/1991 | Mazelie | |
| 5,692,525 A | 12/1997 | Counts et al. | |
| 2004/0219468 A1 | 11/2004 | Hanosek et al. | |
| 2012/0305433 A1 | 12/2012 | Duner et al. | |
| 2015/0027458 A1* | 1/2015 | Grant | A24D 1/04 131/328 |

FOREIGN PATENT DOCUMENTS

| | | |
|---|---|---|
| CN | 201001396 Y | 1/2008 |
| CN | 101878959 A | 11/2010 |
| JP | 58-88897 | 6/1983 |
| JP | 1-129573 | 9/1989 |
| JP | 2010-88404 A | 4/2010 |
| RU | 28 588 U1 | 4/2003 |
| RU | 2012 122 689 A | 2/2014 |
| WO | WO 2004/019710 A1 | 3/2004 |
| WO | WO 2009/022232 A2 | 2/2009 |
| WO | WO 2013/104616 A1 | 7/2013 |

OTHER PUBLICATIONS

Decision on grant dated May 10, 2018 in Kazakhstan Patent Application No. 2016/1206.1 (with English language translation), 8 pages.

Chinese Office Action w/ English translation dated Dec. 4, 2018 in corresponding Chinese Patent Application No. 201580028399.7, (18 pages).

Japanese Office Action dated May 30, 2019 in Japanese Application No. 2016-568566 with English Translation, 9 pages.

Office Action dated Jan. 16,2020 in Japanese Patent Application No. 2016-568566 (with English translation), 11 pages.

* cited by examiner

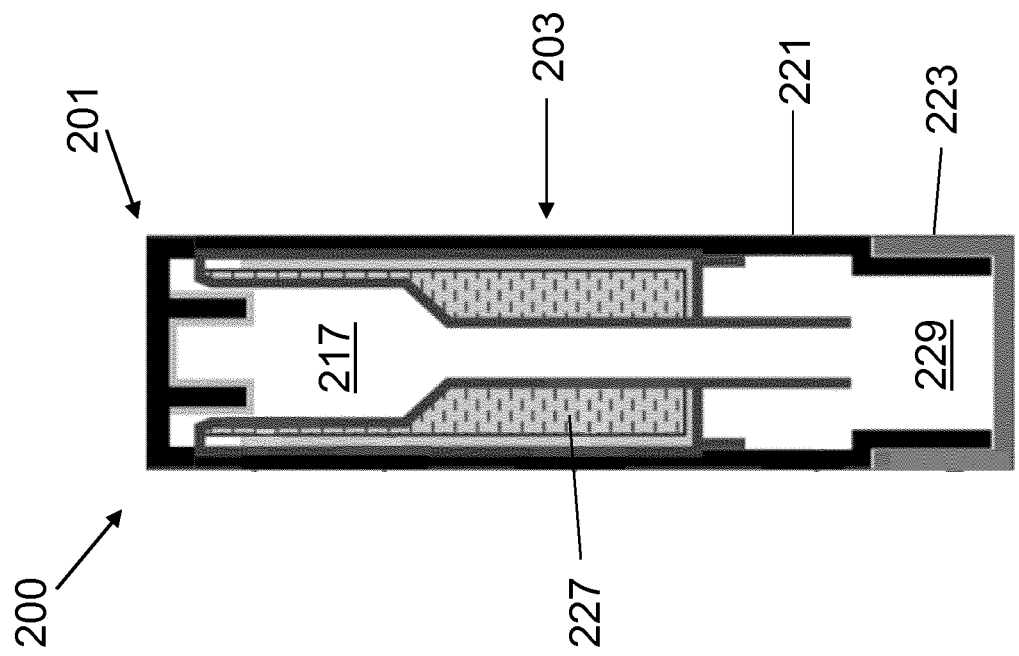
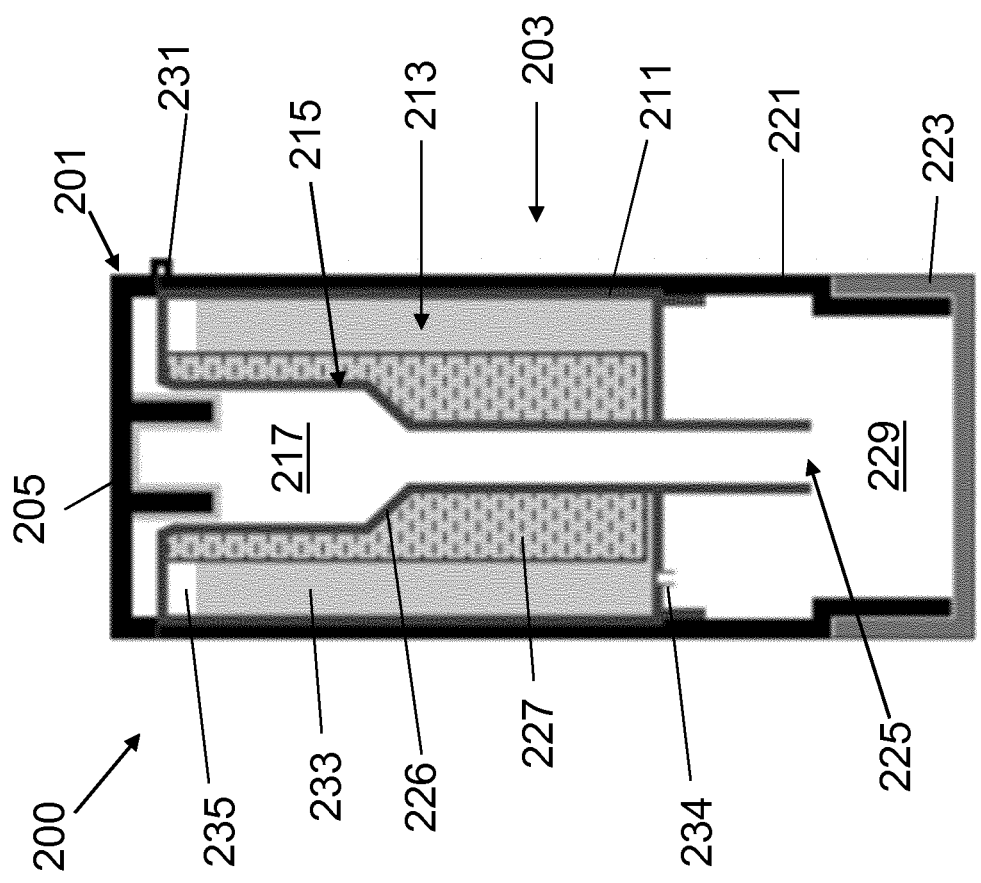
Figure 3
Figure 2

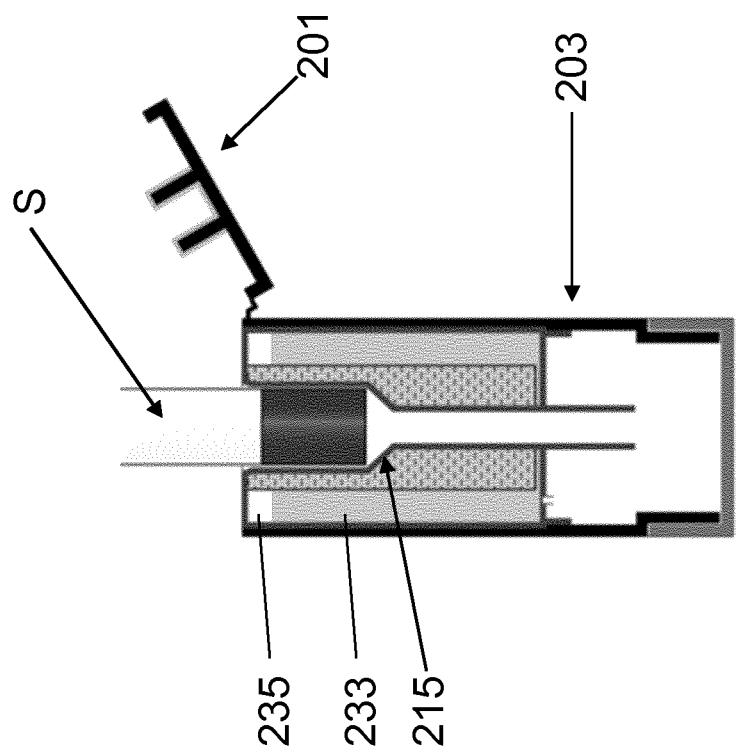
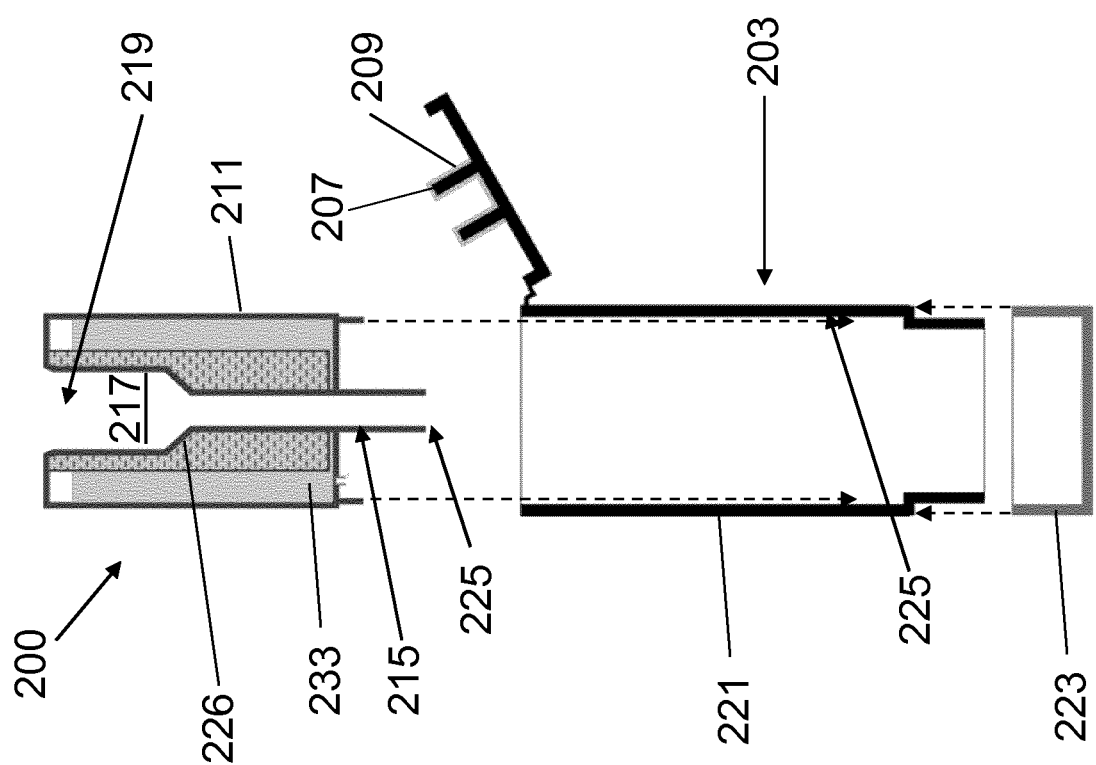
Figure 5
Figure 4

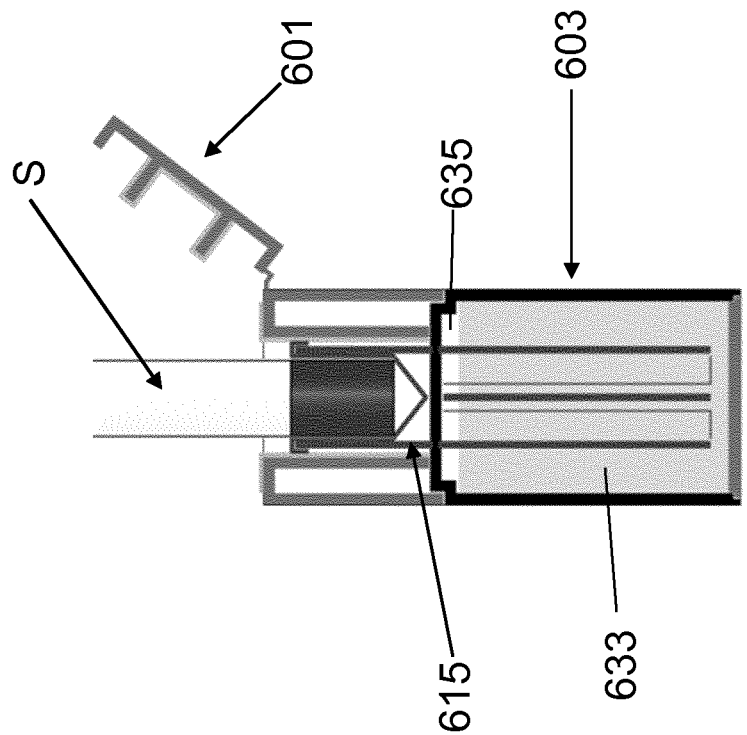
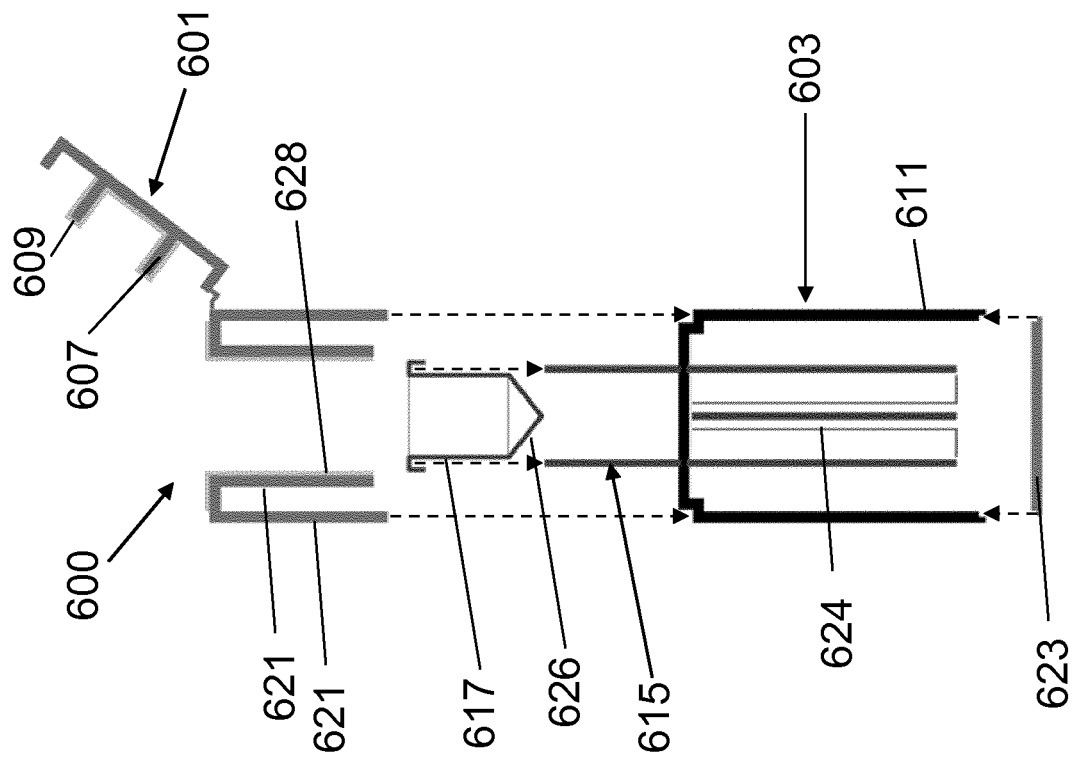

EXTINGUISHER FOR A SMOKING ARTICLE

The present invention relates to an extinguisher for a smoking article. In particular, the present invention relates to a portable extinguisher for extinguishing a single smoking article at a time.

A number of smoking articles in which tobacco is heated rather than combusted have been proposed in the art. An aim of such heated smoking articles is to reduce known harmful smoke constituents produced by the combustion and pyrolytic degradation of tobacco in conventional cigarettes. In heated smoking articles, an aerosol is generated by heating a flavour generating substrate, such as tobacco. Known heated smoking articles include, for example, electrically heated smoking articles and smoking articles in which an aerosol is generated by the transfer of heat from a combustible fuel element or heat source to a physically separate aerosol forming material. The aerosol forming material may be located within, around or downstream of the fuel element. For example, WO-A-2009/022232 discloses a smoking article comprising a combustible heat source, an aerosol-generating substrate downstream of the combustible heat source and a heat-conducting element around and in contact with a rear portion of the combustible heat source and an adjacent front portion of the aerosol-generating substrate. During smoking, volatile compounds are released from the aerosol forming material by heat transfer from the fuel element and entrained in air drawn through the smoking article. As the released compounds cool they condense to form an aerosol that is inhaled by the consumer.

Smoking articles, which include a combustible fuel element or heat source, may have a combustion zone or zone of heating that is larger, more dense, and not as readily extinguished by crushing or "stubbing out" the heat source compared to a conventional cigarette, in which tobacco is burnt or combusted to heat and release volatile compounds from the tobacco. Such smoking articles may have a heat source that contains significantly more energy in the form of heat than found in the combustion zone of a conventional cigarette. Consequently, such smoking articles may require more effort to extinguish or to remove sufficient heat to facilitate disposal.

Accordingly, it would be desirable to provide an improved extinguisher for smoking articles, particularly one which may be used with smoking articles that include a combustible fuel element or heat source.

According to a first aspect of the invention, there is provided a portable extinguisher for extinguishing a single smoking article at a time, the extinguisher comprising: a reservoir, a chamber sized to receive at least part of a single smoking article, and an opening to receive a single smoking article into the chamber; wherein the reservoir and the chamber are thermally coupled and wherein the chamber is isolated from the reservoir such that there is no fluid communication between the chamber and the reservoir, and wherein the reservoir contains a phase change material arranged such that, in use, heat energy from a smoking article received in the chamber is absorbed by a phase transition of the phase change material.

The extinguisher according to the invention is a portable extinguisher, which has a conveniently small size for a user and is particularly suited to extinguishing smoking articles that include a combustible fuel element or heat source.

The extinguisher may be used with any type of smoking article. Throughout this specification, the term "smoking articles" should be inferred to mean, not only conventional cigarettes, in which the substrate, usually tobacco, is combusted, but also smoking articles, for example heated smoking articles, in which the substrate is heated rather than combusted and which rely on aerosol formation from the heated substrate, and distillation-based smoking articles, including those having a combustible heat source, such as the smoking article described in WO-A-2009/022232. The extinguisher is particularly useful for extinguishing heated smoking articles in which an aerosol is generated by the transfer of heat from a combustible fuel element or heat source to a physically separate aerosol forming material, which may be located within, around or downstream of the fuel element.

The reservoir and the chamber are thermally coupled. This allows the reservoir to absorb heat energy from the chamber to extinguish a smoking article in the chamber. The extinguisher may be used with or without fluid contained in the reservoir.

The reservoir contains a phase change material which is arranged such that, in use, heat energy from a smoking article received in the chamber is absorbed by a phase transition of the phase change material. Preferably, the extinguisher acts as a heatpipe. In examples of aspects of the invention, the extinguisher conducts heat energy to a phase change material in the reservoir and dissipates heat from a smoking article in the chamber at least in part using the phase transition of the phase change material. In certain embodiments, the phase change material absorbs heat at least in part due to a solid-to-liquid phase change. In some circumstances, preferably the phase change material absorbs heat at least in part due to a liquid-to-gas phase change. In one embodiment, the reservoir contains a phase change solid. However, any suitable fluid, phase change solid, or combination of fluids, combination of phase change solids, or combination of fluids and phase change solids may be used.

Preferably, the extinguisher is used with fluid in the reservoir, for example as the phase change material, or in addition to the phase change material. Preferably, the fluid is a liquid. In use, the fluid does not come into direct physical contact with the smoking article, but rather, through indirect contact, draws heat away from the chamber that is in direct contact with the smoking article.

Advantageously, the phase change material may reduce the time taken for a smoking article received in the chamber to be extinguished. In preferred embodiments, the phase change material is arranged such that, in use, heat energy from a smoking article received in the chamber is absorbed by a phase transition of the phase change material to aid the extinguishing of the smoking article.

As used throughout this specification, the term "phase change material" preferably refers to a material having a high latent heat of transition, for example at least about 90 kJ/kg and preferably at least about 140 kJ/kg.

The phase change material is preferably arranged such that, in use, heat energy from a smoking article received in the chamber is at least partly absorbed by a phase transition of the phase change material to aid the extinguishing of the smoking article. In some examples, the phase change material should be contained in the reservoir such that the phase change material has a transition temperature of between ambient temperature and the temperature of the smoking article. In some preferred embodiments, the phase change material has a transition temperature of from about 40 degrees Celsius to about 600 degrees Celsius, preferably from about from about 50 degrees Celsius to about 300 degrees Celsius, more preferably from about 100 degrees Celsius to about 200 degrees Celsius.

In some embodiments, the phase change material has an intrinsic transition temperature at ambient pressure of from about 40 degrees Celsius to about 600 degrees Celsius, preferably from about from about 50 degrees Celsius to about 300 degrees Celsius, more preferably from about 100 degrees Celsius to about 200 degrees Celsius, at atmospheric pressure.

In other embodiments, the phase change material may have an intrinsic transition temperature at ambient pressure of less than 40 degrees Celsius, for example less than 20 degrees Celsius, but may be stored in the reservoir under a pressure which is greater than atmospheric pressure, for example at 2 bar, such that the phase change material has a transition temperature of from about 40 degrees Celsius to about 600 degrees Celsius, preferably from about from about 50 degrees Celsius to about 300 degrees Celsius, more preferably from about 100 degrees Celsius to about 200 degrees Celsius.

The phase change material may have a high heat storage capacity. For example, the phase change material may have a storage volume of 16 metres cubed or less. Preferably, the phase change material has a storage volume of less than about 10 metres cubed, preferably less than about 8 metres cubed. The term "storage volume" refers to the volume of material needed to absorb an energy of 10^6 Joules.

The term "fluid" used throughout this specification refers to any substance which can flow freely and which can assume the shape of its container. Suitable fluids include, but are not limited to, liquids, gases, creams, foams, gels, powders, particulate materials and granular materials, and combinations thereof. Preferably, the extinguisher is used with a substance that is a liquid at room temperature at the gas pressure in which the fluid is stored in the reservoir. In certain embodiments, the fluid in the extinguisher may be stored in the reservoir under atmospheric ambient pressure or pressure greater than atmospheric ambient pressure. Use of fluid facilitates extinguishing of the smoking article by drawing heat away from the chamber. The fluid may have a high heat capacity to more efficiently draw heat away from the chamber to facilitate extinguishing. This may be particularly advantageous when the extinguisher is used with smoking articles including a combustible fuel element or heat source, because such smoking articles may have a combustion zone or zone of heating that is larger, more dense, and not as readily extinguished by crushing or "stubbing out" the heat source compared to a conventional cigarette. In certain preferred embodiments, the fluid is a liquid, cream, foam, or gel, or any combination thereof. The fluid may be water, for example. Alternatively, or in addition, the fluid may be a volatile liquid with a low boiling point. With such liquids, heat is drawn away from the chamber by the evaporation of the volatile liquid. As with fluids having a high heat capacity, this facilitates extinguishing and may be particularly advantageous when the extinguisher is used with smoking articles including a combustible fuel element or heat source, because such smoking articles may have a combustion zone or zone of heating that is larger, more dense, and not as readily extinguished by crushing or "stubbing out" the heat source compared to a conventional cigarette. Suitable volatile liquids include, but are not limited to, ammonia, alcohol (such as methanol or ethanol), water, propane and butane, or combinations thereof. However, any suitable fluid, or combination of fluids may be used. If the fluid comprises a powder, a solid particulate material, a solid granular material, or a mixture thereof, the position of the fluid within the reservoir is preferably fixed, such as in a matrix, to facilitate absorption of heat from the chamber. Preferably, the fluid does not consist solely of gas. In other words, if the fluid comprises a gas, the fluid preferably further comprises at least one other phase. For example, where the fluid comprises a gas, the fluid may further comprise one or more of a liquid, a gel, a cream, a foam, a powder, a solid particulate material, or a solid granular material.

The extinguisher may be pre-filled with fluid. Alternatively, the extinguisher may be fillable by a user. The extinguisher may be filled with fluid via an opening in the reservoir. The extinguisher may act as a heatpipe, that is, the extinguisher may conduct heat energy to a phase change material in the reservoir and to dissipate heat from a smoking article using the phase transition of the phase change material. In certain embodiments, the phase change material absorbs heat due to a solid-to-liquid phase change. More preferably, the phase change material absorbs heat due to a liquid-to-gas phase change. In one embodiment, the reservoir contains a phase change solid. However, any suitable fluid, phase change solid, or combination of fluids, combination of phase change solids, or combination of fluids and phase change solids may be used.

As used herein, by "volatile" it is meant the liquid has a vapour pressure of at least about 20 Pa. Unless otherwise stated, all vapour pressures referred to herein are vapour pressures at 25° C. measured in accordance with ASTM E1194-07.

The reservoir may be open. In a preferred embodiment, the reservoir is sealed. By 'sealed' it is meant that the reservoir is fluid-tight, that is, any fluid contained within the reservoir will remain in the reservoir during normal use. This reduces the risk of fluid leakage from the extinguisher, for example if the extinguisher is inverted. The reservoir may be sealed and refillable or sealed and non-refillable.

The term "thermally coupled" used throughout this specification is used to mean that the chamber and the reservoir are in thermal contact such that thermal energy readily flows between the chamber and the reservoir. Preferably, the thermal conductivity between the chamber and the reservoir is at least 40 W/m·K. Unless otherwise stated, thermal conductivity values referred to herein are thermal conductivity values as measured in accordance with ASTM C1114-00.

In certain embodiments, the extinguisher further comprises a thermally conductive sleeve through which the reservoir and the chamber are thermally coupled. Preferably, the thermal conductivity of the sleeve is at least 40 W/m·K, more preferably at least 100 W/m·K. The chamber may be outside of the sleeve. In preferred embodiments, the chamber is at least partially within the sleeve. This advantageously increases the heat transfer from the chamber to the sleeve and thus from the chamber to the reservoir, facilitating extinguishing of the smoking article. The chamber may be entirely within the sleeve. The chamber and the sleeve may be separate components. Where the chamber and the sleeve are separate components they may be in direct contact or connected via one or more thermal bridges. In certain embodiments, the chamber is integral with and defined by the sleeve.

Where the chamber and the reservoir are thermally coupled by a thermally conductive sleeve, the sleeve may extend around at least part of the reservoir. In preferred embodiments, the sleeve at least partially extends into the reservoir. The sleeve may extend along the entire length of the reservoir or may extend along only part of the length of the reservoir. The sleeve may be contained entirely within the reservoir.

Where the phase change material comprises water, the reservoir, and if applicable the thermally conductive sleeve, should be formed from, or coated with, a material which is resistant to oxidation and to reactivity with water and which is resistant to pressure. In one particular embodiment, the reservoir contains water and the sleeve is formed from titanium. In another embodiment, the reservoir contains water and the sleeve is formed from copper.

The extinguisher is sized so as to be hand-held or portable, and suitable for extinguishing a single smoking article at a time. The chamber has a size such that at least part of only a single smoking article at a time can be received. Preferably, the chamber has a size to receive the combustion zone of a smoking article. Preferably, the chamber has a size such that it forms a tight fit around a single smoking article. This increases the heat transfer between the smoking article and the chamber. The tight fit between the walls of the chamber and the smoking article also restricts the supply of oxygen to help extinguish to the smoking article. Preferably, the chamber is substantially circular, so as to receive a smoking article having a substantially circular cross section. Preferably, the extinguisher is sized to extinguish a single smoking article but not to store smoking articles, either extinguished or unused. In heated smoking articles, including those which include a combustible fuel element or heat source, the aerosol generating substrate is not burned in the same way as in a conventional cigarette. Thus, the used smoking article may be substantially the same size as the unused smoking article. This is not the case for conventional cigarettes, where the unused cigarette is generally considerably larger than the used cigarette. Storage for used, extinguished heated smoking articles might therefore need to be considerably larger than storage for extinguished conventional cigarettes. By providing an extinguisher which is sized to extinguish only a single smoking article at a time, and not to store smoking articles, the portable extinguisher can be made smaller and more convenient for a user. Additionally, the portable extinguisher may be advantageously sized so that it unobtrusively clips to the bottom of smoking article packaging.

If the extinguisher is arranged to extinguish conventional smoking articles, the extinguisher is sized to be suitable for extinguishing a single conventional smoking article at a time. Preferably, however, the extinguisher is arranged to extinguish smoking articles including a combustible fuel element or heat source. In that case, the extinguisher is sized to be suitable for extinguishing a single smoking article, including a combustible fuel element or heat source, at a time.

Preferably, the extinguisher is arranged to extinguish smoking articles having a diameter between about 5 mm and about 9 mm. More preferably, the extinguisher is arranged to extinguish smoking articles having a diameter between about 7 mm and about 8 mm. Preferably, the chamber has a cross section between about 8 mm and about 9 mm. More preferably, the chamber has a cross section of from about 8 mm to about 8.3 mm.

The external shape of the extinguisher is preferably elongate in height with a cross section that is substantially rectangular. Other alternative suitable shapes may be used, including, for example, circular, oval, trigonal, octagonal, rhomboidal, trapezoidal, or any combination thereof. In certain preferred embodiments, the extinguisher has a height of between about 50 mm and about 65 mm and a depth between about 13 mm and about 25 mm. The external dimensions of the extinguisher may be adjusted.

The reservoir may be defined by an outer vessel, wherein the outer vessel is at least partially separated from the sleeve. The separation may be any suitable separation which limits heat transfer between the sleeve and the outer vessel. For example, the outer vessel may be at least partially separated from the sleeve by a space. The separation provides insulation, which may reduce heat transfer to the exterior of the extinguisher. This may prevent heat from the smoking article burning a user's hands. This may be particularly important when the extinguisher is used with smoking articles including a combustible fuel element or heat source, because such smoking articles may have a heat source containing a significant amount of heat energy that should be dissipated to facilitate easy disposal. When the extinguisher is used with fluid, the fluid may partially or completely fill the space. The space may define the reservoir. Alternatively, the space may be separate from the fluid-containing portion of the outer vessel or sleeve. For example, the outer vessel may be at least partially separated from the sleeve by structural members, for example ribs, buttresses, props, supports, struts or a honeycomb structure. Preferably, the sleeve and outer vessel are in contact at one or more locations within the outer vessel. This provides structural support and integrity for the extinguisher.

The outer vessel may comprise any suitable material or materials. Suitable materials include, but are not limited to, metal, glass, polypropylene (PP), polyethylene (PE), polyamide (PA), polystyrene (PS) and silicone, or combinations thereof. In a preferred embodiment, the outer vessel comprises aluminium.

The exterior surfaces of the outer vessel may be printed, embossed, debossed or otherwise embellished with manufacturer or brand logos, trade marks, slogans and other consumer information and indicia. If a sticker is applied to an exterior surface of the outer vessel, the sticker may be printed, embossed, debossed or otherwise embellished with manufacturer or brand logos, trade marks, slogans and other consumer information and indicia.

The sleeve may comprise any suitable material or materials. Suitable materials include, but are not limited to, aluminium, copper and steel, or combinations thereof. In a preferred embodiment, the sleeve comprises aluminium.

The sleeve may have any suitable shape and size. The sleeve may have a shape and a size designed for maximum heat dissipation. The sleeve may be elongate. The sleeve may have a circular cross section. The sleeve may have one or more apertures. The one or more apertures should have a size and position on the sleeve to allow fluid communication between the sleeve and the reservoir to increase heat transfer between the sleeve and the reservoir. The one or more apertures may comprise one or more longitudinal slits. The sleeve may comprise a cage or mesh structure. The sleeve may be open or closed at the end opposite the chamber.

The chamber may comprise any suitable material or materials. Suitable materials include, but are not limited to, aluminium, copper and steel, or combinations thereof. In a preferred embodiment, the chamber comprises aluminium.

The chamber is isolated from the reservoir such that there is no fluid communication between the chamber and the reservoir. This means that a smoking article received in the chamber will not come into direct contact with any fluid in the reservoir. The extinguisher is thus a "dry" extinguisher. This is advantageous as any fluid in the reservoir will not be contaminated by the smoking article during normal use of the extinguisher. The cleanliness of the extinguisher is thus improved. Additionally, since the reservoir is sealed, fluid cannot readily escape from the device, for example through spillage or evaporation. Consequently, the extinguisher may not require refilling. Preferably, the reservoir is sealed so fluid cannot escape from the device, for example through spillage or evaporation.

The chamber may have a shape and a size designed for maximum heat dissipation. The end of the chamber opposite the opening may be any suitable shape. In certain embodiments, the end of the chamber opposite the opening is conical. This allows the tip of the heat source to be crushed or "stubbed out" against the chamber, facilitating extinguishing. The end of the chamber opposite the opening may be closed to form a receptacle for ash deposited by a smoking article during normal use of the extinguisher. The end of the chamber opposite the opening may be open to allow ash deposited by a smoking article during normal use of the extinguisher to pass from the chamber to a separate compartment of the extinguisher. Where the end of the chamber opposite the opening is conical and is open, the conical end may act as a funnel for ash deposited by a smoking article during extinguishing. The chamber may form a stopper for limiting the extent a smoking article can extend into the extinguisher.

The reservoir may comprise a wick. The wick may be at least partially in contact with an exterior surface of the sleeve. The wick may substantially surround the sleeve. Preferably, the wick surrounds the sleeve and is in contact with the exterior surface of the sleeve. Preferably, the wick is in contact with the exterior surface of the sleeve along substantially the entire length of the portion of the sleeve extending into the reservoir.

The wick may be wetted with liquid contained in the reservoir to ensure that the sleeve is in contact with the liquid. This may be particularly advantageous where a portion of the sleeve or the chamber would otherwise not be in contact with the liquid, for example where a headspace is provided towards the top of the reservoir. The wick may ensure that liquid in the reservoir is distributed across the length of the sleeve. The wick may draw liquid towards the sleeve by capillary action to replace liquid evaporated by the sleeve. In such cases, the wick may ensure that there is liquid in contact with the sleeve, regardless of the orientation of the extinguisher, when a smoking article is inserted into the extinguisher.

The use of a wick may be advantageous if the phase change material is a phase change solid which draws heat energy from a smoking article by melting. In such cases, the wick may act to hold the phase change material close to the chamber when it is in liquid form so that when the phase change material subsequently solidifies upon cooling, it remains in close proximity to the chamber.

The wick may comprise any suitable material or materials. The wick may comprise a high retention material, for example high retention materials comprising polyethylene-polypropylene or polyethylene-terephthalate compositions. Other suitable materials include, but are not limited to, metal foams or meshes, glass fibre, low density foam (such as polyethylene). In a preferred embodiment, the wick comprises aluminium mesh.

The extinguisher may further comprise a housing. The sleeve may be at least partially within the housing and at least partially separated from the housing. This separation provides insulation to the housing of the extinguisher. The housing may also support the sleeve to ensure that the sleeve cannot move relative to the reservoir, for example when a smoking article is received in the chamber. This may provide stability. The housing may have a guide element within which the sleeve fits and is supported. This positions the sleeve within the housing and the reservoir.

Where the extinguisher includes an outer vessel, the outer vessel may be attached to the housing. The outer vessel may be at least partially within the housing. Where the end of the chamber opposite the opening is open, the chamber may be in communication with a compartment in the housing. The compartment may receive and store ash deposited in the chamber from a smoking article during normal use of the extinguisher. The housing may include a removable end cap for allowing access to the compartment, for cleaning and removal of accumulated ash. The outer vessel may be spaced apart from the housing. The compartment may be formed by the space between the outer vessel and the housing.

The housing may comprise any suitable material or materials. Suitable materials include, but are not limited to, metals, ceramic, polypropylene (PP), polyethylene (PE), polyamide (PA), polystyrene (PS), polyoxymethylene (POM), silicone, and high temperature resistive plastics such as polyaryletherketones (PEAK) and fluoric polymers such as polytetrafluoroethylene (PTFE) or combinations thereof. In a preferred embodiment, the housing comprises aluminium.

The exterior surfaces of the housing may be printed, embossed, debossed or otherwise embellished with manufacturer or brand logos, trade marks, slogans and other consumer information and indicia.

The opening may be defined by the housing. In such embodiments, the opening may be sized to receive a single smoking article. The opening may be integral with the housing and form part of the guide element. The opening and the guide element may be coated with a heat-resistant liner. The heat resistant liner may reduce the chance of heat damage to the extinguisher when a smoking article is received in the opening and as heat is absorbed by the chamber.

The heat-resistant liner may comprise any suitable material or materials. Suitable materials include, but are not limited to, thermosetting plastics such as silicone, polyester, polyurethane, vulcanized rubber, polyimide and vinyl ester, or combinations thereof. In a preferred embodiment, the heat resistant liner comprises silicone.

The opening may remain open during normal use and storage of the extinguisher. In certain embodiments, the extinguisher may include a lid for selectively closing the opening.

The lid may comprise any suitable material or materials. Suitable materials include, but are not limited to, metals, polypropylene (PP), polyethylene (PE), polyamide (PA), polystyrene (PS) and silicone, or combinations thereof. In a preferred embodiment, the lid comprises aluminium.

The lid, when closed, may prevent escape of ash from the extinguisher by closing the opening. The lid, when closed, may create an airtight seal. The lid may be arranged to close any further openings which are provided in the extinguisher, or additional lids for those openings may be provided.

Preferably, the lid comprises a member arranged to cooperate with the opening when the lid is closed, to prevent unintentional opening of the lid. For example, the lid may comprise a plug which is received in the opening when the lid is closed. The lid or opening or both the lid and the opening may include a compressible coating or an O-ring, to assist in creating a friction fit between the lid and the opening. The coating, O-ring or O-rings may comprise any suitable material or materials, for example, but not limited to nitrile butadiene rubber (NBR).

The lid may have any form suitable for use with the extinguisher. The lid may be separate from the housing or outer vessel or attached to the housing or outer vessel. For example, the lid may be a snap-fit lid, a sliding lid, a hinge lid or a flip top lid. If the lid is attached to the housing or the outer vessel, the lid may be formed integrally with the housing or outer vessel or may be fastened to the housing or outer vessel, for example using a hinge pin.

The exterior surfaces of the lid may be printed, embossed, debossed or otherwise embellished with manufacturer or brand logos, trade marks, slogans and other consumer information and indicia.

The portable extinguisher may comprise means for attaching the extinguisher to another object. Preferably, the portable extinguisher further comprises a clip for attaching the extinguisher to another object. For example, the clip may be arranged to attach the extinguisher to a pack of smoking articles. Preferably, the smoking articles are smoking articles which can be extinguished by the extinguisher. The dimensions of the extinguisher may be selected to match dimensions of the pack. For example, in one embodiment, the height of the extinguisher may substantially match the width of the pack and the depth of the extinguisher may substantially match the depth of the pack. Thus, the extinguisher may unobtrusively clip to the bottom of the pack.

The clip may comprise any suitable material or materials, including, but not limited to stainless steel, for example stainless steel grade 1.4301, and stainless spring steel, or combinations thereof.

The clip may be integrally formed with a part of the extinguisher, for example the housing, outer vessel or lid. Alternatively, the clip may be a separate component which is fixed to a part of the extinguisher, for example the housing, outer vessel or lid. The clip may be fixed by any suitable means, for example, but not limited to, a snap-fit, a spring-fit, glue or fixing means, for example one or more screws.

Preferably the extinguisher further comprises a fluid contained within the reservoir. In one embodiment, the fluid comprises water. In one embodiment, the fluid comprises a volatile liquid.

According to a second aspect of the invention, there is provided portable lighter assembly, the lighter assembly comprising a portable extinguisher according to the first aspect of the invention, and an ignition assembly in fluid communication with the reservoir, wherein the fluid contained within the reservoir is a flammable liquid fuel and the ignition assembly is arranged to ignite the flammable liquid fuel to form a lighting flame.

The ignition assembly may comprise any suitable ignition assembly. For example, the ignition assembly may comprise an electric spark generator, or a mechanical spark generator, such as a strike wheel.

According to a third aspect of the invention, there is provided a pack of smoking articles, or a packaging for a pack of smoking articles, comprising a portable extinguisher according to the first aspect of the invention or a portable lighter assembly according to the second aspect of the invention.

Packs of smoking articles according to the invention may have substantially the same construction as known packs of smoking articles including, but not limited to, hinge-lid packs, slide and shell packs, shoulder packs and booklet packs.

Packs of smoking articles according to the invention may be 'hard' packs. For example, packs according to the invention may be rigid hinge-lid containers comprising a box portion and a lid portion connected to the box portion along a hinge line extending across the rear wall of the container. In such embodiments, the portable extinguisher or the portable lighter assembly may be attached to the exterior of the box portion or the lid portion, or disposed within the box portion.

Alternatively, packs of smoking articles according to the invention may be rigid slide and shell containers having an outer shell and an inner slide or tray in which the smoking articles are housed and which is slidable within the outer shell. In such embodiments, the portable extinguisher or the portable lighter assembly may be attached to the exterior of the outer shell or disposed in the inner slide of the rigid slide and shell container.

In yet further embodiments, packs of smoking articles according to the invention may be 'soft' packs comprising a cup-shaped box containing a wrapped bundle of smoking articles.

If the portable extinguisher or the portable lighter assembly is attached to the exterior of the pack, it may be attached by any suitable attaching means, for example, but not limited to, a clip, a snap-fit, a spring-fit, glue or fixing means, for example one or more screws. Where the portable extinguisher or the portable lighter assembly is attached using a clip, the clip may be fixed to the portable extinguisher or the portable lighter assembly or to the pack and by any suitable means, for example, but not limited to, a snap-fit, a spring-fit, glue or fixing means, for example one or more screws.

Packs of smoking articles according to the present invention may have one or more right-angled longitudinal edges, one or more right-angled transverse edges, one or more rounded longitudinal edges, one or more rounded transverse edges, one or more bevelled longitudinal edges, one or more bevelled transverse edges, or any suitable combination thereof. For example, by scoring in a known manner one or more laminar blanks from which the containers are produced, 'rounded-corner' and 'bevelled-corner' packs of smoking according to the invention may be produced.

Packs of smoking articles according to the invention may advantageously house smoking articles including, but not limited to, conventional lit-end cigarettes, cigars or cigarillos, heated smoking articles comprising a combustible fuel element or heat source and an aerosol-generating substrate (for example cigarettes of the type disclosed in U.S. Pat. No. 4,714,082) and smoking articles for use with electrical smoking systems (for example cigarettes of the type disclosed in U.S. Pat. No. 5,692,525).

It will be appreciated that through an appropriate choice of the dimensions of the packaging, packs of smoking articles according to the invention may house different total numbers of smoking articles or different arrangements of smoking articles. For example, containers according to the invention may house a total of between ten and thirty smoking articles.

The smoking articles may be arranged in different collations, depending on the total number of smoking articles. For example, the smoking articles may be arranged in a single row of six, seven, eight, nine or ten. Alternatively, the smoking articles may be arranged in two or more rows. The two or more rows may contain the same number of smoking articles. For example, the smoking articles may be arranged in: two rows of five, six, seven, eight, nine or ten; three rows of five or seven; or four rows of four, five or six. Alternatively, the two or more rows may include at least two rows containing different numbers of smoking articles to each other. For example, the smoking articles may be arranged in: a row of five and a row of six (5-6); a row of six and a row of seven (6-7); a row of seven and a row of eight (7-8); a middle row of five and two outer rows of six (6-5-6); a middle row of five and two outer rows of seven (7-5-7); a middle row of six and two outer rows of five (5-6-5); a middle row of six and two outer rows of seven (7-6-7); a middle row of seven and two outer rows of six (6-7-6); a middle row of nine and two outer rows of eight (8-9-8); or a middle row of six with one outer row of five and one outer row of seven (5-6-7).

Alternatively or in addition, packs of smoking articles according to the invention may house smoking articles of different dimensions (for example, smoking articles of different length or different circumference). For example, the pack may house smoking articles with lengths of between about 40 mm and about 180 mm and diameters of between about 4 mm and about 9 mm.

Packs of smoking articles according to the invention may house filterless smoking articles and smoking articles with various filter tips. In addition, packs of smoking articles according to the invention may house smoking articles of the same type or brand, or of different types or brands (for example, smoking articles with different filters, tobacco blends, flavours, total particulate matter delivery, resistance to draw or nicotine delivery). Preferably, the dimensions of the container are adapted to the length of smoking articles, and the collation of the smoking articles housed therein. Typically, the external dimensions of the container are between about 0.5 mm and about 5 mm larger than the dimensions of the bundle or bundles of smoking articles housed therein.

Preferably, packs of smoking articles according to the invention house a plurality of smoking articles wrapped in an inner liner of, for example, metal foil or metallised paper.

Packs of smoking articles according to the invention may be overwrapped in a known manner with any suitable known material or combination of materials including, but not limited to, cellophane, polymeric films of, for example, polyethylene or polypropylene, metallised polymeric films and laminated polymeric films. Packs of smoking articles according to the invention may be overwrapped with overwrappers including one or more tear tapes. The one or more tear tapes may extend in a transverse or longitudinal direction around the perimeter of the container.

According to a fourth aspect of the invention, there is provided a portable extinguisher for extinguishing a single smoking article at a time, the extinguisher comprising:

a reservoir;

a chamber sized to receive at least part of a single smoking article; and an opening to receive at least part of the smoking article into the chamber;

wherein the reservoir and the chamber are thermally coupled and wherein the chamber is isolated from the reservoir such that there is no fluid communication between the chamber and the reservoir, the extinguisher further comprising a thermally conductive sleeve thermally coupled to the chamber and the reservoir and arranged to increase a heat transfer from the chamber to the reservoir, wherein, in use, heat energy from a smoking article received in the chamber is drawn away by the reservoir.

In preferred embodiments, the thermally conductive sleeve is arranged to increase the heat transfer from the chamber to the reservoir such that, in use, heat energy from a smoking article received in the chamber is drawn away by the reservoir to extinguish the smoking article.

According to a fifth aspect of the invention, there is provided a portable extinguisher for extinguishing a single smoking article at a time, the extinguisher comprising: a reservoir, a chamber sized to receive at least part of a single smoking article, and an opening to receive a single smoking article into the chamber; wherein the reservoir and the chamber are thermally coupled and wherein the chamber is isolated from the reservoir such that there is no fluid communication between the chamber and the reservoir.

Features described in relation to one aspect of the invention may also be applicable to the other aspect of the invention.

The invention will be further described, by way of example only, with reference to the accompanying drawings in which:

FIG. 2 is a cross-sectional front view of an extinguisher according to a first embodiment of the invention, with the lid closed;

FIG. 3 is a cross-sectional side view of the extinguisher of FIG. 2, with the lid closed;

FIG. 4 is an expanded view of the extinguisher of FIGS. 2 and 3;

FIG. 5 is a cross-sectional front view of the extinguisher of FIGS. 2 and 3, with the lid open and a smoking article in the chamber;

FIG. 8 is an expanded view of the extinguisher of FIGS. 6 and 7;

FIG. 9 is a cross-sectional front view of the extinguisher of FIGS. 6 and 7, with the lid open and a smoking article in the chamber;

The invention provides a portable extinguisher for extinguishing a single smoking article. As discussed above, one particularly useful application of the portable extinguisher is for extinguishing heated smoking articles in which an aerosol is generated by the transfer of heat from a combustible fuel element or heat source to a physically separate aerosol forming material, which may be located within, around or downstream of the fuel element.

Figure 1:
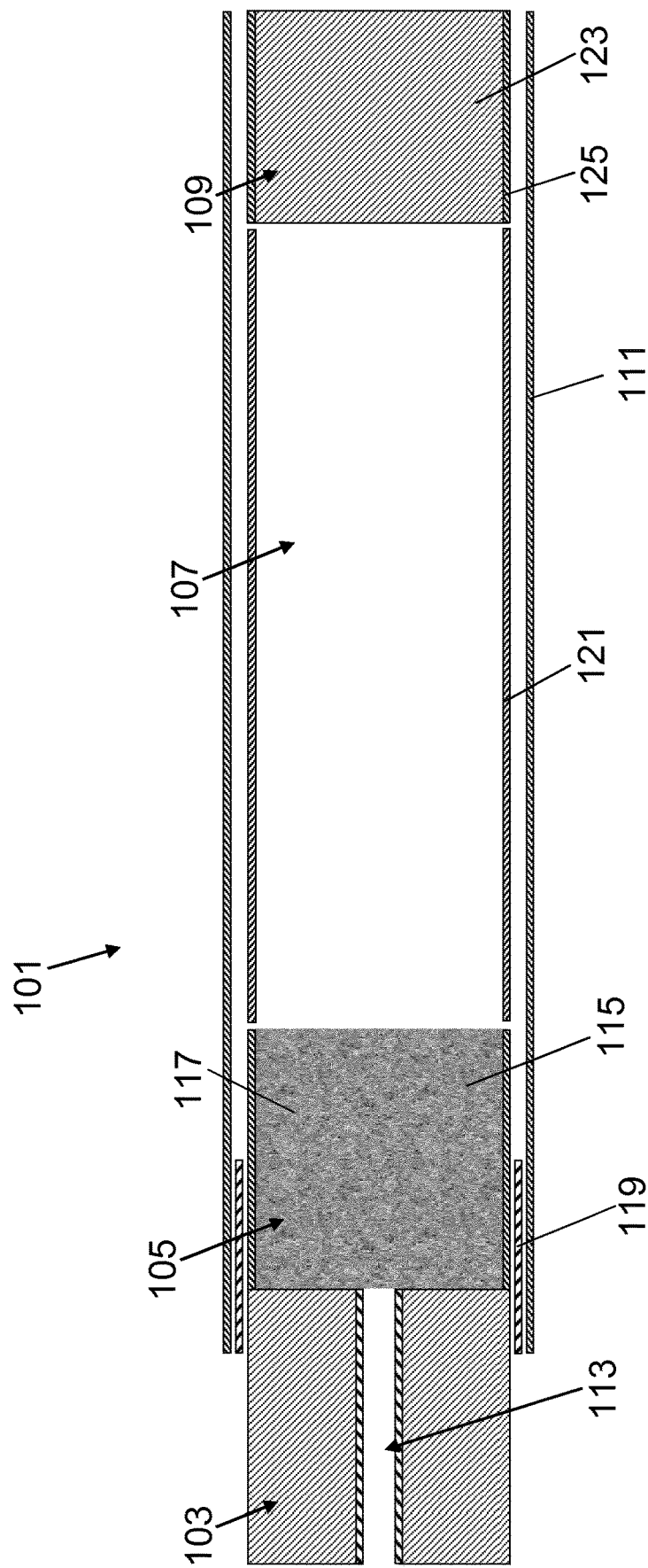
FIG. 1 shows a smoking article including a combustible heat source.

FIG. 1 shows one example of a smoking article with which the extinguisher of the invention may be used. FIG. 1 shows a smoking article similar to that described in WO-A-2009/022232. The smoking article 101 comprises a combustible heat source 103, an aerosol-generating substrate 105, an elongate expansion chamber 107 and a mouthpiece 109 in abutting coaxial alignment, which are overwrapped in an outer wrapper of cigarette paper 111. The combustible heat source 103 is cylindrical and comprises a central airflow channel 113 which extends longitudinally through the heat source 103. The aerosol-generating substrate 105 is located immediately downstream of the combustible heat source 103 and comprises a cylindrical plug of homogenised tobacco material 115 comprising glycerine as aerosol former and circumscribed by filter plug wrap 117. A heat-conducting element 119, consisting of a tube of aluminium foil, surrounds and is in contact with a rear portion of the combustible heat source 103 and an abutting front portion of the aerosol-generating substrate 105. The elongate expansion chamber 107 is located downstream of the aerosol-generating substrate 105 and comprises a cylindrical open-ended tube of cardboard 121. The mouthpiece 109 is located downstream of the expansion chamber 107 and comprises a cylindrical plug of cellulose acetate tow 123 circumscribed by filter plug wrap 125.

The extinguisher of the present invention may be used to extinguish any smoking article, but finds particular application as an extinguisher for smoking articles like the one shown in FIG. 1.

FIGS. 2, 3, 4 and 5 are cross-sectional views an extinguisher 200 according to a first embodiment of the invention. FIGS. 2 and 3 show the lid of the extinguisher closed, FIG. 4 is an expanded view of the extinguisher, and FIG. 5 shows the lid of the extinguisher open with a smoking article in the chamber.

Referring to FIGS. 2, 3 and 4, extinguisher 200 comprises a lid 201 and a base 203. Lid 201 comprises cap 205, plug 207 and plug cap 209. Base 203 comprises an outer vessel 211 defining a sealed reservoir 213, thermally conductive sleeve 215 defining a chamber 217 having an upper opening 219, outer housing 221 and removable end cap 223 which closes the lower end of outer housing 221. The plug 207 is attached to the cap 205 and the plug cap 209 provides a friction fit between the plug 207 and the upper opening 219 when the lid 201 is closed. Sleeve 215 fits within and is attached to outer vessel 211. Sleeve 215 extends into and through the length of reservoir 213 to form a fluid-tight passage within the reservoir 213. Sleeve 215 is separated from the side walls of the outer vessel 211. The separation provides insulation, which may reduce heat transfer from the sleeve 215 to the exterior of the extinguisher 200. The sleeve 215 has a lower opening 225 at its end opposite to the chamber 217. Chamber 217 is integral with and defined by the upper end of the sleeve 215. The chamber 217 is sized to receive a single smoking article. The side walls of the chamber 217 narrow to form a conical base at the end of the chamber 217 which is opposite the upper opening 219. The conical base 226 is open such that the chamber 217 is in communication with the lower opening 225 of the sleeve 215. The conical base 226 of the chamber 217 forms a stopper for limiting the extent a smoking article can extend into the extinguisher 200. The reservoir 213 includes a wick 227 positioned around and in contact with sleeve 215 in the region of the chamber 217. The wick 227 extends towards the lower end of the reservoir 213 to draw up fluid from below the chamber 217. Outer vessel 211 and sleeve 215 are held within outer housing 219 such that both are separate from the lower end of the outer housing 221. The separation defines a compartment 229 into which the lower opening 225 of the sleeve 215 extends. End cap 223 is removable from the outer housing 221 to allow access to the compartment 229 for cleaning.

In this embodiment, lid 201 is a hinge lid which may be attached to housing 221 of base 203 with a film hinge 231. Lid 201 is moveable between a closed position (shown in FIGS. 2 and 3) and an open position (shown in FIGS. 4 and 5). When the lid 201 is in the closed position, plug 207 in lid 201 engages with upper opening 219 in base 203 to prevent unintentional opening of the lid 201.

Extinguisher 200 further comprises a volatile liquid 233 contained in the reservoir 213 and a valve 234 for filling the reservoir 213 with the volatile liquid 233 during manufacture. The reservoir 213 is not completely filled with volatile liquid 233 but has a head space 235 to allow vaporisation of the volatile liquid 233 without over-pressurising the reservoir 213. Extinguisher 200 may further comprise a clip (not shown) which may be attached to housing 221 to attach the extinguisher to another object, such as to a pack of smoking articles.

In the embodiment illustrated in FIGS. 2, 3, 4 and 5, the cap 205 comprises aluminium, the plug 207 comprises aluminium, the plug cap 209 comprises nitrile butadiene rubber (NBR), the outer vessel 211 comprises aluminium, the sleeve 215 comprises aluminium, housing 221 comprises aluminium, end cap 223 comprises aluminium, wick 227 comprises aluminium foam, and the volatile liquid 233 comprises butane.

To extinguish a smoking article using the extinguisher 200, the lid 201 is opened and a smoking article S inserted into the upper opening 219 and into the chamber 217, as shown in FIG. 5. The walls of the chamber 217 absorb heat energy from the heat source of the smoking article S and conduct it along the length of the sleeve 215. The sleeve 215 heats the volatile liquid 233 in contact with the sleeve 215, causing it to evaporate. The evaporation of the liquid 233 absorbs energy which is distributed throughout the reservoir 213 as the vapour expands within the reservoir 213 and subsequently condenses upon contact with cooler parts of the reservoir 213, such as the walls of the outer vessel 211, to release the accumulated heat. The wick 227 draws liquid 233 towards the sleeve 215 through capillary action to ensure a constant supply of liquid 233 against the sleeve 215. By this action, the extinguisher rapidly draws heat energy away from the heat source to extinguish the smoking article S. The tight fit between the walls of the chamber 217 and the heat source also restricts the supply of oxygen to the heat source to help extinguish the smoking article S. The tip of the heat source may be crushed or "stubbed out" against the conical base 226 of the chamber 217 to facilitate extinguishing. The conical base 226 acts as a funnel for ash removed from the heat source, the ash falling through the base 226 into the compartment 229 via the lower opening 225 of the sleeve 215. Ash collects in the compartment 229 and can be removed from the extinguisher 200 by removing the end cap 223 of the base 203 to access the receptacle 229.

Figure 7:
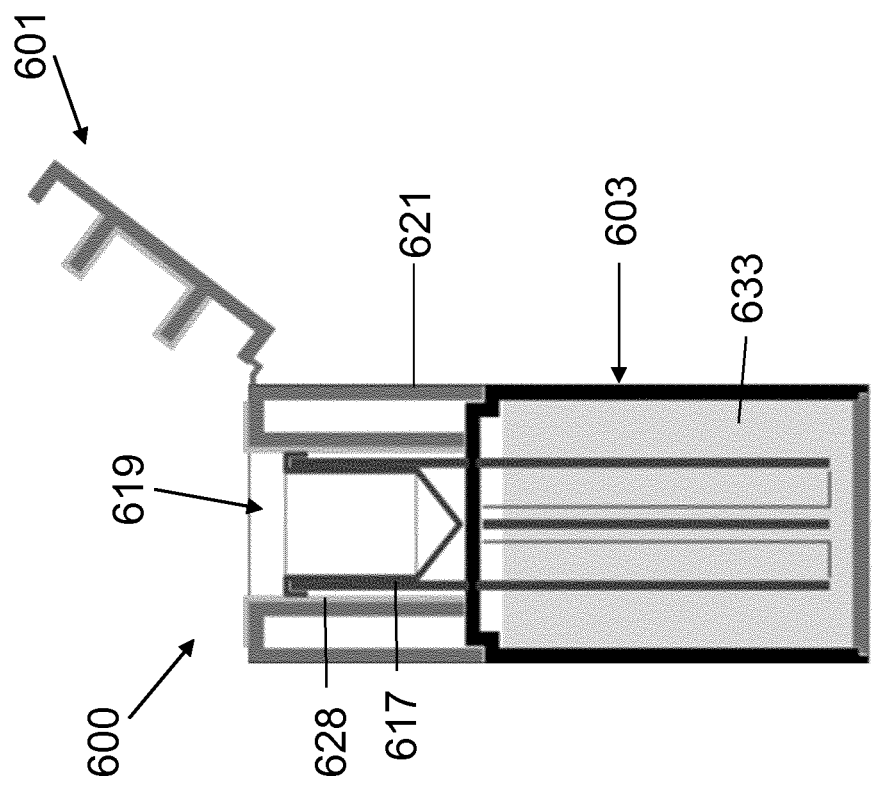
FIG. 7 is a cross-sectional front view of the extinguisher of FIG. 6, with the lid open.
Figure 6:
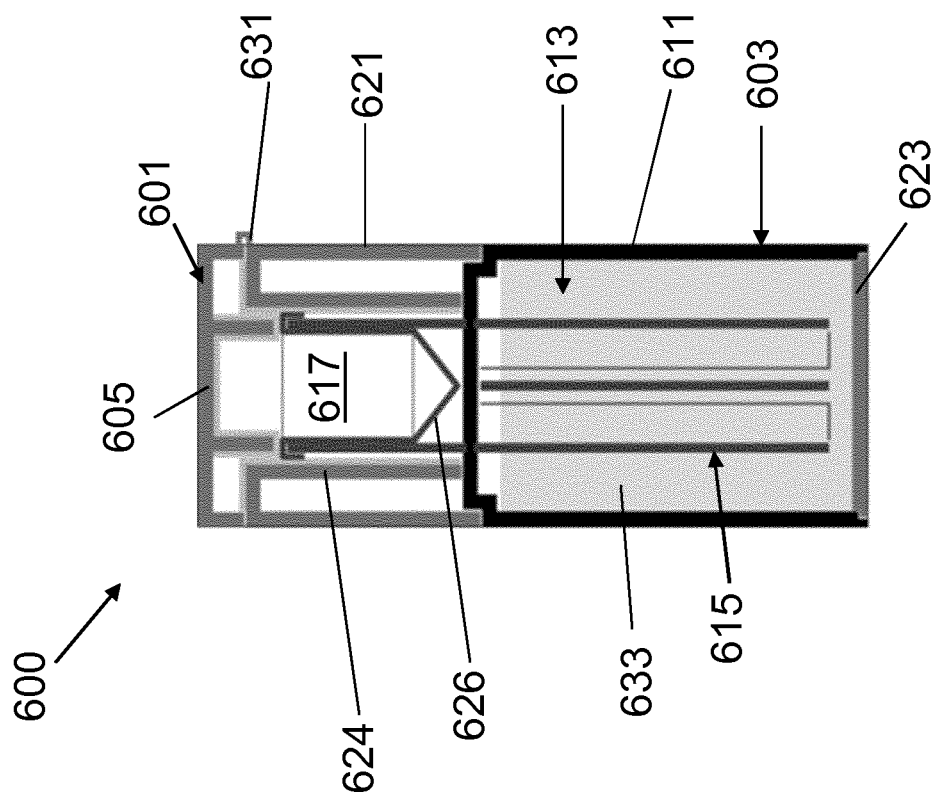
FIG. 6 is a cross-sectional front view of an extinguisher according to a second embodiment of the invention, with the lid closed.

FIGS. 6, 7, 8 and 9 are cross-sectional views an extinguisher according to a second embodiment of the invention. FIG. 6 shows the lid of the extinguisher closed. FIG. 7 shows the lid of the extinguisher open. FIG. 8 is an expanded view of the extinguisher, and FIG. 9 shows the lid of the extinguisher open with a smoking article in the chamber.

Referring to FIGS. 6, 7 and 8, extinguisher 600 comprises a lid 601 and a base 603. Lid 601 comprises cap 605, plug 607 and plug cap 609. Base 603 comprises an outer vessel 611 defining a sealed reservoir 613, a thermally conductive sleeve 615, a chamber 617, an opening 619 and a housing 621. Outer vessel 611 has an upper wall 622 and an end cap 623 which seal the reservoir 613. The opening is integral with and defined by the housing 621. The plug 607 is attached to the cap 605 and the plug cap 609 provides a friction fit between the plug 607 and the opening 619 when the lid 601 is closed. Outer vessel 611 is attached to housing 621. Sleeve 615 extends through the upper wall 622 of the outer vessel 611 and into the reservoir 213. Housing 621 has a guide element 624 within which the sleeve 615 fits and is supported. This positions the sleeve 615 within the housing 621 and the reservoir 613. Sleeve 615 has a number of longitudinal slits 626 to increase heat transfer from the sleeve 615 to the reservoir 613. Sleeve 615 is separated from the exterior of housing 621 by the guide element 624 and is separated from the outer vessel 611. These separations provide insulation, which may reduce heat transfer from the sleeve 615 to the exterior of the extinguisher 600. In this embodiment, chamber 617 is a separate component which is inserted into the upper end of the sleeve 615 and is in direct contact with the sleeve 615. Alternatively, chamber 617 may be integral with and defined by the sleeve 615, as in extinguisher 200 according to the first embodiment. Chamber 617 is sized to receive a single smoking article. The side walls of the chamber 617 narrow to form a conical base 626 at the lower end of the chamber 617. In this embodiment, the conical base 626 is closed. The conical base 626 of the chamber 617 forms a stopper for limiting the extent a smoking article can extend into the extinguisher 600 and forms a receptacle for ash deposited by a smoking article during normal use of the extinguisher 600. The reservoir 613 may include a wick (not shown) positioned around and in contact with sleeve 615. The wick may extend towards the lower end of the reservoir 613 to draw up fluid from below.

The opening 619 is sized to receive a single smoking article. In this embodiment, the opening 619 is integral with the housing 621 and forms part of the guide element 624. The opening 619 and the guide element 624 are coated with a heat-resistant liner 628.

In this embodiment, lid 601 is a hinge lid which may be attached to outer vessel 611 of base 603 with a film hinge 631. Lid 601 is moveable between a closed position (shown in FIG. 6) and an open position (shown in FIGS. 7 and 8). When the lid 601 is in the closed position, plug 607 in lid 601 engages with opening 619 in base 603 to prevent unintentional opening of the lid 601.

Extinguisher 600 further comprises a working liquid 633 contained in the reservoir 613. As with the extinguisher 200 according to the first embodiment, the reservoir 613 is not completely filled with liquid 633 but has a head space 635 to allow vaporisation of the liquid 633 without over-pressurising the reservoir 613. Extinguisher 600 may further comprise a clip (not shown) which may be attached to outer vessel 611, housing 621, or both, to attach the extinguisher to another object, such as to a pack of smoking articles.

In the embodiment illustrated in FIGS. 6, 7, 8 and 9, the cap 605 comprises a polyamide, the plug 607 comprises a polyamide, the plug cap 609 comprises nitrile butadiene rubber, the outer vessel 611 comprises polyamide, the sleeve 615 comprises aluminium, the chamber 617 comprises aluminium, housing 621 and the guide element 624 comprise polyamide, end cap 623 comprises polyamide, and the working liquid 633 comprises water.

To extinguish a smoking article using the extinguisher 600, the lid 601 is opened and a smoking article S inserted into the opening formed by lip 619 and into the chamber 617, as shown in FIG. 9. The side walls of the chamber 617 form a tight fit around the heat source of the smoking article S. Heat energy from the heat source of the smoking article S is absorbed by the chamber 617 and conducted to and along the length of the sleeve 615. The heat resistant liner 628 reduces the chance of heat damage to the extinguisher 600 as the smoking article S is received in the opening 619 and as heat is absorbed by the chamber 617. The portion of the sleeve 615 which extends into the reservoir 613 heats the water 633, drawing heat away from the heat source. Heat from the sleeve 615 may also cause the water 633 to evaporate, assisting in the drawing of heat away from the heat source due to the latent heat of evaporation. By this action, the extinguisher rapidly draws heat energy away from the heat source to extinguish the smoking article S. The tight fit between the walls of the chamber 617 and the heat source also restricts the supply of oxygen to the heat source to help extinguish the smoking article S. The tip of the heat source may be crushed or "stubbed out" against the conical base 626 of the chamber 617, facilitating extinguishing. The conical base 626 acts as a receptacle for ash removed from the heat source. Once the smoking article S has been extinguished and removed from the extinguisher 600, ash can be removed from the chamber 617 by inverting the extinguisher 600.

Figure 11:
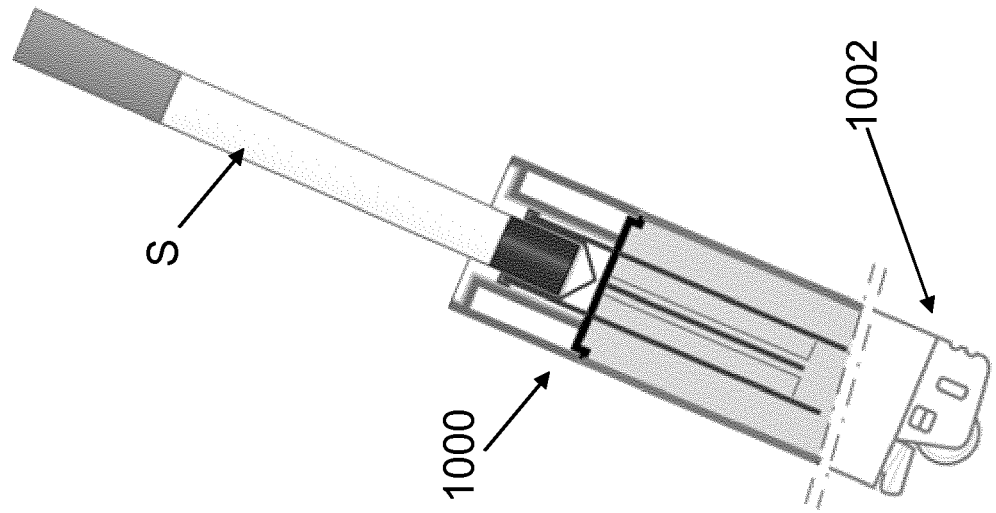
FIG. 11 is a cross-sectional front view of the extinguisher of FIG. 10, with a smoking article in the chamber.
Figure 10:
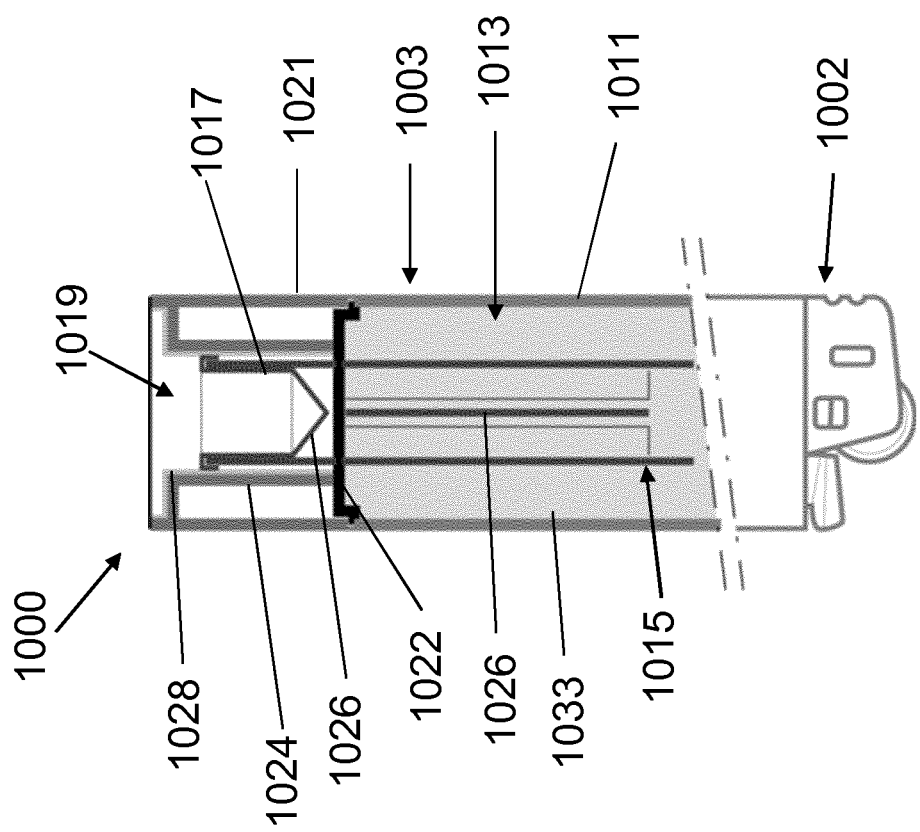
FIG. 10 is a cross-sectional front view of an extinguisher according to a third embodiment of the invention.

FIGS. 10 and 11 are cross-sectional views an extinguisher 1000 according to a third embodiment of the invention. FIG. 10 shows the extinguisher on its own. FIG. 11 shows the extinguisher with a smoking article in the chamber. Extinguisher 1000 is very similar to the extinguisher 600 shown in FIGS. 6, 7, 8 and 9 except that the extinguisher includes an ignition assembly, the reservoir doubles as a reservoir of flammable liquid fuel for the ignition assembly and the extinguisher does not comprise a lid. The ignition assembly is arranged to ignite the flammable liquid fuel to form a lighting flame. Extinguisher 1000 thus doubles as a portable lighter assembly.

More specifically, extinguisher 1000 comprises an ignition assembly 1002 and a base 1003. Ignition assembly 1002 is a conventional lighter ignition assembly. Base 1003 comprises an outer vessel 1011 defining a sealed reservoir 1013, a thermally conductive sleeve 1015, a chamber 1017, opening 1019 and housing 1021. Outer vessel 1011 has an upper wall 1022 adjacent to the housing 1021 and an end wall 1023 adjacent to the ignition assembly 1002. Outer vessel 1011 is attached to housing. Sleeve 1015 extends through the upper wall 1022 of the outer vessel 1011 and into the reservoir 1013. Housing 1021 has a guide element 1024 within which the sleeve 1015 fits and is supported. This positions the sleeve 1015 within the housing 1021 and the reservoir 1013. Sleeve 1015 has a number of longitudinal slits 1026 to increase heat transfer from the sleeve 1015 to the reservoir 1013. Sleeve 1015 is separated from the exterior of the housing 1021 by the guide element 1024 and is separated from the outer vessel 1011. These separations provide insulation, which may reduce heat transfer from the sleeve 1015 to the exterior of the extinguisher 1000. In this embodiment, chamber 1017 is a separate component which is inserted into the upper end of the sleeve 1015 and is in direct contact with the sleeve 1015. Alternatively, chamber 1017 may be integral with and defined by the sleeve 1015, as in extinguisher 200 according to the first embodiment. Chamber 1017 is sized to receive a single smoking article. The side walls of the chamber 1017 narrow to form a conical base 1026 at the lower end of the chamber 1017. In this embodiment, the conical base 1026 is closed. The conical base 1026 of the chamber 1017 forms a stopper for limiting the extent a smoking article can extend into the extinguisher 1000 and forms a receptacle for ash deposited by a smoking article during normal use of the extinguisher 1000. The reservoir 1013 may include a wick (not shown) positioned around and in contact with sleeve 1015. The wick may extend towards the lower end of the reservoir 1013 to draw up fluid from below.

The opening 1019 is sized to receive a single smoking article. In this embodiment, the opening is integral with the housing 1021 and forms part of the guide element 1024. The opening 1019 and the guide element 1024 are coated with a heat-resistant liner 1028.

Extinguisher 1000 further comprises a flammable liquid fuel 1033 contained in the reservoir 1013. As with the extinguishers according to the first and second embodiments, the reservoir 1013 is not completely filled with liquid 1033 but has a head space 1035 to allow vaporisation of the liquid 1033 without over-pressurising the reservoir 1013. Extinguisher 1000 further comprises a tube or a wick (not shown) extending from the ignition assembly 1002 into the reservoir 1013 through which the ignition assembly 1002 is supplied, in a conventional manner, with liquid fuel 1033 from the reservoir 1013 for forming a flame. Extinguisher 1000 may further comprise a clip (not shown) which may be attached to outer vessel 1011, housing 1021, or both, to attach the extinguisher to further object, such as to a pack of smoking articles.

In the embodiment illustrated in FIGS. 10 and 11, the outer vessel 1011 comprises styrene acrylonitrile copolymer (SAN), the sleeve 1015 comprises aluminium, the chamber 1017 comprises aluminium, housing 1021 and guide element 1024 comprise polyamide, upper wall 1022 comprises polyoxymethylene, and the flammable liquid fuel 1033 comprises butane.

To extinguish a smoking article using the extinguisher 1000 a smoking article S is inserted into the opening formed by lip 1019 and into the chamber 1017, as shown in FIG. 11. The side walls of the chamber 1017 form a tight fit around the heat source of the smoking article S. Heat energy from the heat source of the smoking article S is absorbed by the chamber 1017 and conducted to and along the length of the sleeve 1015. The heat resistant liner 1028 reduces the chance of heat damage to the extinguisher 1000 as the smoking article S is received in the opening 1019 and as heat is absorbed by the chamber 1017. The portion of the sleeve 1015 which extends into the reservoir 1013 heats the butane 1033, in contact with the sleeve 1015, causing it to evaporate. The evaporation of the butane 1033 absorbs energy which is distributed throughout the reservoir 1013 as the vapour expands within the reservoir 1013 and subsequently condenses upon contact with cooler parts of the reservoir 1013 to release the accumulated heat. By this action, the extinguisher rapidly draws heat energy away from the heat source to extinguish the smoking article S. The tight fit between the walls of the chamber 1017 and the heat source also restricts the supply of oxygen to the heat source to help extinguish the smoking article S. The tip of the heat source may be crushed or "stubbed out" against the conical base 1026 of the chamber 1017, facilitating extinguishing. The conical base 1026 acts as a receptacle for ash deposited by a smoking article during normal use of the extinguisher 1000. Once the smoking article S has been extinguished and removed from the extinguisher 1000, ash can be removed from the chamber 1017 through opening 1019 by inverting extinguisher 1000.

The invention claimed is:

1. A portable extinguisher for extinguishing a single smoking article at a time, the portable extinguisher comprising:
   a reservoir;
   a chamber having side walls and being sized to receive at least part of the single smoking article;
   an opening configured to receive at least a part of the single smoking article into the chamber; and
   a thermally conductive sleeve,
   wherein the reservoir and the chamber are thermally coupled by the sleeve and wherein the sleeve extends into the reservoir,
   wherein the chamber is isolated from the reservoir such that there is no fluid communication between the chamber and the reservoir, and
   wherein the reservoir contains a phase change material, the phase change material being a volatile liquid, the phase change material being arranged such that heat energy from the single smoking article received in the chamber is absorbed by the side walls of the chamber, conducted along the length of the sleeve, and absorbed by a liquid to gas phase transition of the phase change material.

2. The portable extinguisher according to claim 1, further comprising a fluid contained within the reservoir.

3. The portable extinguisher according to claim 2, wherein the fluid comprises one or more of water and a volatile liquid.

4. The portable extinguisher according to claim 1, wherein the reservoir is sealed.

5. The portable extinguisher according to claim 1, wherein the chamber is at least partially within the sleeve.

6. The portable extinguisher according to claim 5, wherein the chamber is integral with and defined by the sleeve.

7. The portable extinguisher according to claim 1, wherein the sleeve at least partially extends into the reservoir.

8. The portable extinguisher according to claim 1,
   wherein the reservoir is defined by an outer vessel, and
   wherein the sleeve is at least partially separated from the outer vessel.

9. The portable extinguisher according to claim 1, wherein the reservoir comprises a wick at least partially in contact with an exterior surface of the sleeve.

10. The portable extinguisher according to claim 9, wherein the wick substantially surrounds the sleeve.

11. The portable extinguisher according to claim 1, wherein an end of the chamber opposite the opening is conical shaped.

12. The portable extinguisher according to claim 1, wherein an end of the chamber opposite the opening is open.

13. The portable extinguisher according to claim 1, further comprising a compartment in communication with an end of the chamber opposite the opening, configured to receive and to store ash deposited in the chamber.

14. A portable lighter assembly, comprising:
   the portable extinguisher according to claim 2; and
   an ignition assembly in fluid communication with the reservoir,
   wherein the fluid contained within the reservoir is a flammable liquid fuel and the ignition assembly is configured to ignite the flammable liquid fuel and to form a lighting flame.

* * * * *